United States Patent
Marathe et al.

(10) Patent No.: US 11,216,274 B2
(45) Date of Patent: Jan. 4, 2022

(54) EFFICIENT LOCK-FREE MULTI-WORD COMPARE-AND-SWAP

(71) Applicant: Oracle International Corporation, Redwood City, CA (US)

(72) Inventors: Virendra J. Marathe, Burlington, MA (US); Alex Kogan, Burlington, MA (US); Mihail-Igor Zablotchi, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 17/086,065

(22) Filed: Oct. 30, 2020

(65) Prior Publication Data

US 2021/0049010 A1 Feb. 18, 2021

Related U.S. Application Data

(63) Continuation of application No. 16/405,848, filed on May 7, 2019, now Pat. No. 10,824,424.
(Continued)

(51) Int. Cl.
*G06F 12/16* (2006.01)
*G06F 9/30* (2018.01)
*G06F 12/0804* (2016.01)

(52) U.S. Cl.
CPC ...... *G06F 9/30021* (2013.01); *G06F 9/30032* (2013.01); *G06F 12/0804* (2013.01); *G06F 2212/1032* (2013.01)

(58) Field of Classification Search
CPC ............ G06F 9/30021; G06F 9/30032; G06F 12/0804; G06F 2212/1032
See application file for complete search history.

(56) References Cited

U.S. PATENT DOCUMENTS 6,141,794 A * 10/2000 Dice .................. G06F 8/447
 713/375
7,328,316 B2 2/2008 Moir et al.
(Continued)

OTHER PUBLICATIONS

James H. Anderson et al., "Universal Constructions for Multi-Object Operations", Department of Computer Science, University of North Carolina, pp. 1-10.
(Continued)

*Primary Examiner* — Cheng Yuan Tseng
(74) *Attorney, Agent, or Firm* — Robert C. Kowert; Kowert, Hood, Munyon, Rankin & Goetzel, P.C.

(57) ABSTRACT

A computer comprising one or more processors and memory may implement an atomic compare and swap (CAS) operation on multiple data elements. Each data element has a corresponding descriptor which includes a new value and a reference to a controlling descriptor for the CAS operation. The controlling descriptor includes a status value which indicates whether the CAS operation is in progress or has completed. The operation first allocates memory locations of the data elements by writing addresses of respective descriptors to the memory locations using CAS instructions. The operation then writes successful status to the status value of the controlling descriptor to indicate that the respective memory locations are no longer allocated. The operation then returns an indicator of successful completion without atomically updating the memory locations with the new values. Extensions are further described to implement CAS operations in non-volatile random access memories.

20 Claims, 14 Drawing Sheets

Related U.S. Application Data

(60) Provisional application No. 62/670,573, filed on May 11, 2018.

(56) References Cited

U.S. PATENT DOCUMENTS

| | | | | |
|---|---|---|---|---|
| 7,685,583 | B2* | 3/2010 | Moir | G06F 9/526 |
| | | | | 717/153 |
| 8,041,752 | B2* | 10/2011 | Petrank | G06F 12/0269 |
| | | | | 707/813 |
| 8,468,526 | B2* | 6/2013 | Saha | G06F 9/52 |
| | | | | 718/100 |
| 9,032,100 | B2* | 5/2015 | Pfister | G06F 13/385 |
| | | | | 710/3 |
| 9,052,944 | B2* | 6/2015 | Moir | G06F 9/467 |
| 9,135,178 | B2* | 9/2015 | Shavit | G06F 12/08 |
| 10,482,029 | B1 | 11/2019 | Chanler et al. | |
| 10,768,965 | B1* | 9/2020 | Habusha | G06F 9/45558 |
| 10,824,424 | B2* | 11/2020 | Marathe | G06F 9/3004 |
| 2019/0347098 | A1 | 11/2019 | Marathe et al. | |

OTHER PUBLICATIONS

James H. Anderson, "Implementing Wait-Free Objects on Priority-Based System", Department of Computer Science, University of North Carolina, pp. 1-10.

* cited by examiner

```
struct WordDescriptor {
    void* address;              201
    uintptr_t old;              202
    uintptr_t new;              203
    MCASDescriptor* parent;     204
};
```
200

```
enum StatusType {
    ACTIVE,
    SUCCESS,
    FAIL
};
```
210

```
struct MCASDescriptor {
    StatusType status;          221
    size_t N;
    WordDescriptor words[N];    222
};
```
220

FIG. 2

EFFICIENT LOCK-FREE MULTI-WORD COMPARE-AND-SWAP

This application is a continuation of U.S. patent application Ser. No. 16/405,848, filed May 7, 2019, which claims benefit of priority to U.S. Provisional Patent Application No. 62/670,573 filed May 11, 2018, which are hereby incorporated by reference in their entirety.

BACKGROUND

Field of the Disclosure

This disclosure relates generally to concurrent programming, and more particularly to systems and methods for performing lock-free atomic updates to multiple data elements.

Description of the Related Art

Compare-and-swap (CAS) is a foundational primitive used pervasively in concurrent algorithms in shared memory systems. In particular, it is used extensively in non-blocking algorithms to deliver scalable performance on multicore systems. CAS conditionally updates a memory word such that a new value is written if and only if the old value in that word matches an expected value. Variations of this primitive instruction are provided in nearly every modern processor architecture.

CAS, however, operates only on a single memory word whereas many concurrent algorithms require atomic modification of multiple words. In response, atomic multi-word compare-and-swap (MCAS) operations have been defined. These operations, however, are fairly inefficient. MCAS operations based on transactional memories encounter overheads and shortcomings associated with those specific memories such as the lack of non-blocking progress guarantees and prohibitively high cost of instrumented access to shared memory, while direct constructions of MCAS using CAS primitives require at least three CAS operations per word modified by MCAS and/or require expensive atomic instructions when reading from those words.

Furthermore, CAS-based algorithms are challenged by the emerging domain of byte-addressable non-volatile memory. The contents of non-volatile memory are preserved across full-system crash and, therefore, any concurrent algorithm designed for it must operate correctly in the face of crashes or power failures. Thus, inefficiencies in CAS-based algorithms are compounded when non-volatile memories are considered.

SUMMARY

Methods, techniques and mechanisms for providing efficient lock-free multi-word MCAS operations are described. These MCAS operations are directly constructed from CAS primitives and require only one CAS primitive per modified word. Additionally, these MCAS operations are efficiently extended for use with non-volatile byte-addressable memories. As such, the methods, techniques and mechanisms described herein represent significant improvements in efficiency over traditional MCAS operations.

The improvements in the various embodiments described herein are achieved by elimination of a major source of complexity and overhead in existing MCAS algorithms. Specifically, nearly all existing MCAS algorithms employ operation descriptors with one descriptor for each word to be modified in the MCAS operation. As part of the traditional MCAS operation, designated memory locations to be updated are allocated, one at a time, by replacing the current value in those locations with a pointer to a respective descriptor. Once the MCAS operation completes, these allocations must be released by storing either new or old values into memory locations. This release process, however, requires expensive synchronization with other MCAS operations in progress using atomic update primitives.

The various embodiments described herein avoid this costly synchronization step by releasing these locks in a more efficient manner. Once all memory locations are locked in the conventional manner, the MCAS operation may be completed by simply setting a status for the operation in an operation descriptor, thus avoiding the costly step of atomically updating each memory location. These improved MCAS operations may be further coupled with a lazy reclamation process to recover the various descriptors used without impacting performance-sensitive operations.

BRIEF DESCRIPTION OF THE DRAWINGS

FIG. 2 is a diagram illustrating various data structures used in various embodiments.

Figure 1:
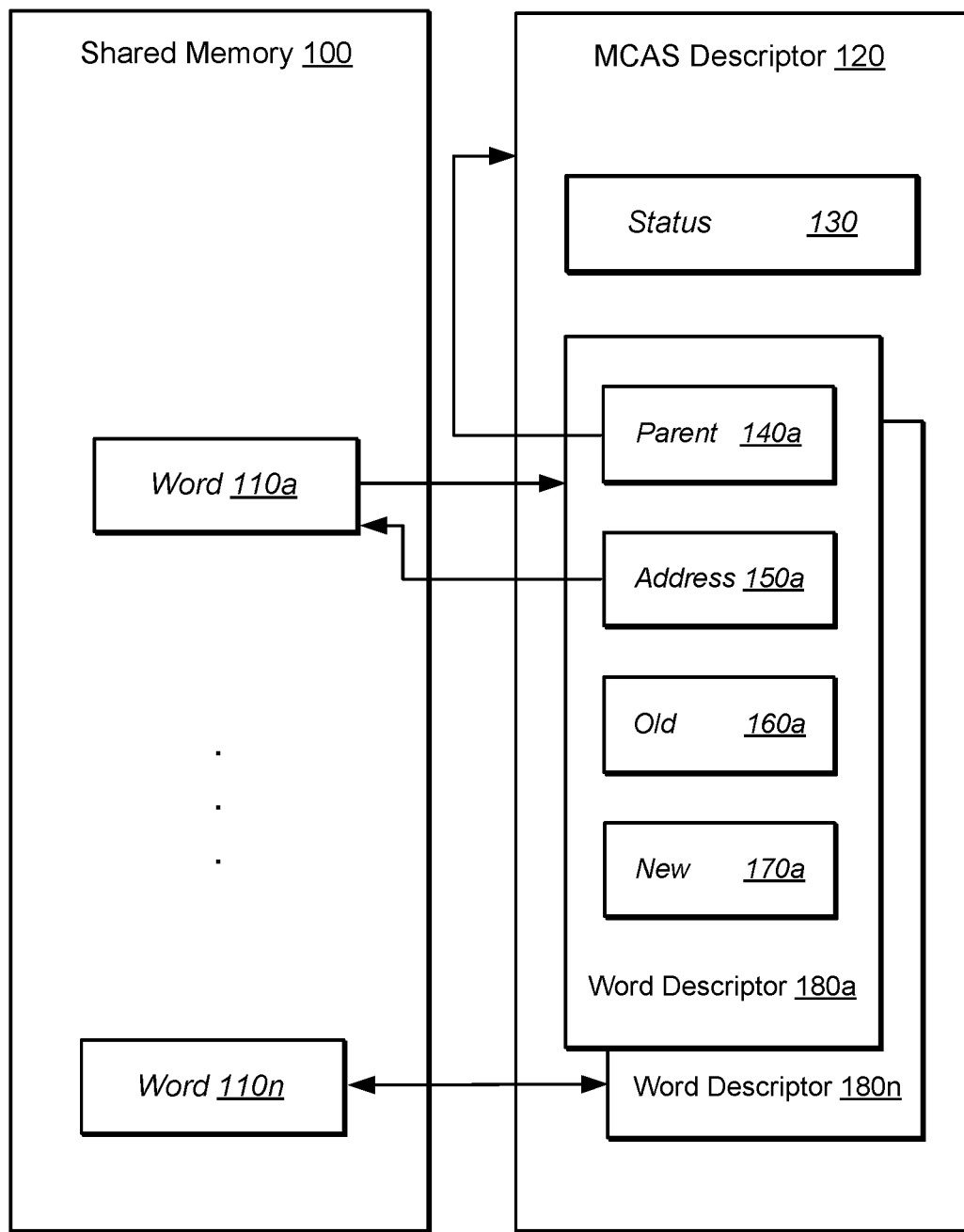
FIG. 1 is a diagram illustrating the relationship between shared memory words and the MCAS control data structures used in various embodiments of an active MCAS operation.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must).

Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

A CAS primitive may operate using three provided arguments, an address of a memory location, and old value, and a new value. The CAS primitive may first read the value stored in the memory location, then compare it to the provided old value and write the new value to the memory location if and only if the value stored in the memory location matches the provided old value. The CAS primitive may then complete by returning the successful result only if the comparison matches and the new value is written. This sequences of steps is performed atomically, resulting in a value in memory that is always predictable and consistent with the result returned from the CAS primitive.

An MCAS operation may operate in a manner similar to a CAS primitive while supporting the atomic updating of multiple memory locations. Various embodiments of MCAS operations, therefore, may receive a list of memory locations along with respective old and new values, they may load current values of all memory locations and compare them to respective old values, then update the memory locations with respective new values if and only if all comparisons result in matches. This sequence of steps must occur, as in the CAS primitive, atomically.

FIG. 1 illustrates the relationship between shared memory words and the MCAS control data structures used in various embodiments of an active MCAS operation. An MCAS Descriptor 120 provides control information for implementing an MCAS operation on Words 110a-110n in Shared Memory 100. In some embodiments, the MCAS Descriptor 120 includes a Status 130 which indicates the current status of the MCAS operation and may be used to determine the current value of a Word 110 that is linked to the MCAS Descriptor 120 while in other embodiments no Status 130 may be used and the current status of the MCAS operation may be determined through the collective status of Words 110a-110n. The MCAS Descriptor 120 also includes one or more Word Descriptors 180, one Word Descriptor for each respective Word 110 involved in the MCAS operation. Each Word Descriptor 180 includes a Parent 140 which contains an address of the controlling MCAS Descriptor 120 and may be used for efficient access to the Status 130 for use in determining the current value of the descriptor's respective Word 110. Each Word Descriptor 180 also includes an Address 150 identifying the respective Word 100 for the Descriptor, and Old value 160 containing the current value of the respective Word 110 and a New value 170 containing the changed value of the respective Word 110 once the MCAS operation completes successfully. During the course of execution of an MCAS operation, Words 110 are linked to their respective Word Descriptors 180 as shown in FIGS. 5-9 and FIG. 11. Once linked, the current values of these Words 110 may be determined using read operations discussed in FIG. 4 and FIG. 10.

FIG. 2 illustrates various data structures used in one embodiment of the control data structures of FIG. 1 described herein. On entry to an MCAS operation, an MCAS operation descriptor, as illustrated in 220, provides information, including a resulting status value 221 for the operation and information 222 describing the words required to be modified, to the MCAS function. The resulting status value 221 may contain one of the possible status values shown in the StatusType enumeration 210. A status of ACTIVE indicates that an MCAS operation is in progress. A status of SUCCESS indicates that an MCAS operation has completed successfully, and a status of FAIL indicates that an MCAS operation has completed unsuccessfully.

Information 222 describing the words required to be modified are shown in the operation descriptor 220 in some embodiments as a number of words N and an array of word descriptors 200. It should be understood, however, that this information is not intended to be limiting and that other implementations of this information can be envisioned. For example, in some embodiments this information may include a number of words and a linked list of word descriptors 200 which may be allocated separately rather than contained within the operation descriptor 220. Furthermore, some embodiments may implement alternative forms of the information 222 as required or encouraged by the particular programming language or environment chosen to implement an MCAS operation. It should be understood that the number of words N is not intended to be constant and can, in fact, vary between MCAS operations and that the embodiment shown in 222 does intend to suggest any specific limit to the number of words supported in an MCAS operation.

A word descriptor is described as shown in block 200 for some embodiments. The word descriptor may contain an address 201 describing the location in memory of the word to be modified. The word descriptor may also contain an old value 202 which the memory location is expected to contain. The word descriptor may also contain a new value 203 which the memory location will contain upon successful completion of the MCAS operation. In some embodiments, the word descriptor may also contain a parent address 204 which identifies the operation descriptor for which the word descriptor is associated. It should be understood that this embodiment of a word descriptor is not intended to be limiting and that other implementations of this descriptor can be envisioned. For example, in some embodiments no parent address 204 may be included and the MCAS operation may be modified to search for this address when required. Likewise, in other embodiments other information may be provided.

Figure 3:
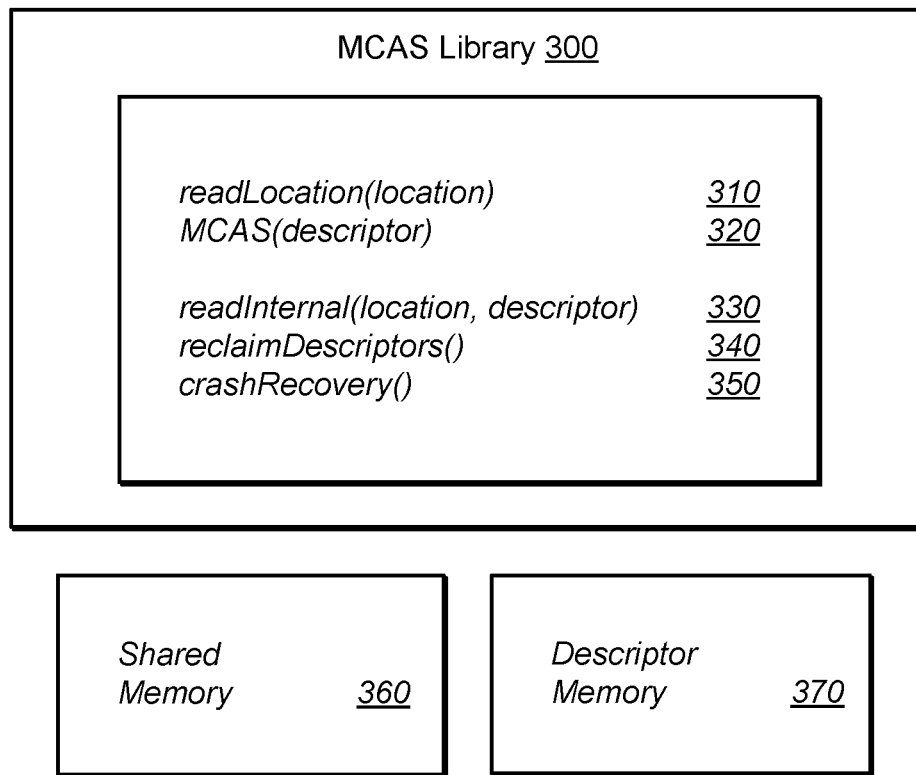
FIG. 3 is a diagram illustrating the components of an MCAS Library according to various embodiments.

FIG. 3 illustrates the components of an MCAS Library according to various embodiments. An MCAS Library 300 may include a readLocation function 310 which provides an application with the ability to read a value from a location in Shared Memory 360 that is updateable using MCAS operations, as described in greater detail in FIG. 10. An MCAS Library 300 may also include an MCAS function 320 which provides an application the ability to perform lock-free multi-word CAS operations on words in Shared Memory 360 as described in greater detail in FIGS. 5-9 and FIG. 11. The readLocation function 310 and MCAS function 320 may optionally use a readInternal function 330 which provides the ability to read a value from a location in Shared Memory 360 and returns both the value associated with the location and information describing allocation state for the location. The readInternal function is described in greater detail in FIG. 4. Each of these functions provides access to locations in Shared Memory 360 and utilizes data structures discussed in FIG. 2 and FIG. 3 located in Descriptor Memory 370. In some embodiments, Shared Memory 360 and Descriptor Memory 370 may be located in the virtual memory address space of an application using the MCAS Library 300 while in other embodiments Shared Memory 360 and Descriptor Memory 370 may be located in a separate memory address space dedicated to the MCAS Library 300 and managed by the MCAS Library 300. Still other embodiments may implement Shared Memory 360 and Descriptor Memory 370 in physical address spaces and may implement Shared Memory 360 and Descriptor Memory 370 either individually or collectively in dedicated memory. For example, one embodiment may implement volatile system memory and implement Shared Memory 360 and Descriptor Memory 370 in a separate, non-volatile memory. It should be understood that these various embodiments of Shared Memory 360 and Descriptor Memory 370 are not intended to be limiting and that other implementations can be envisioned. Additionally, the MCAS Library 300 may optionally include a reclaimDescriptors function 340 which provides the MCAS Library 300 the ability to asynchronously reclaim MCAS Descriptors 120 as described in greater detail in FIG. 12. The MCAS Library 300 may also optionally include a crashRecovery function 350 which provides the MCAS Library 300 the ability to recover and resume operation of non-volatile MCAS operations as described in greater detail in FIG. 13. Furthermore, it should be understood that other functions of an MCAS Library may be optionally provided in various embodiments and that the functions described above are not intended to be limiting.

Figure 4:
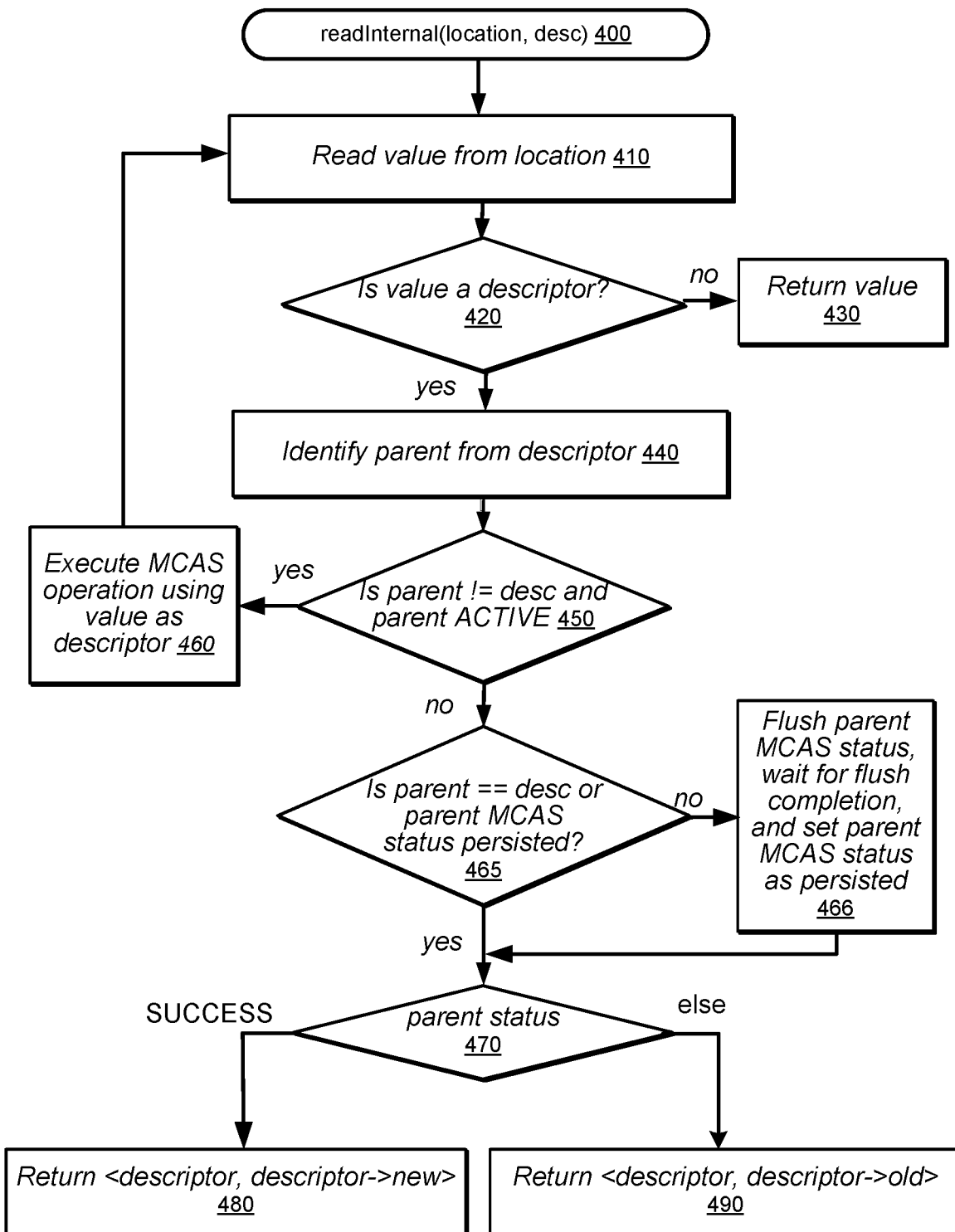
FIG. 4 is a flow diagram illustrating one embodiment of a method for reading a memory location potentially allocated by an MCAS operation and returning both the value stored at the memory location and information describing the allocation state.

FIG. 4 is a flow diagram illustrating a read method for memory locations potentially allocated by an MCAS operation according to some embodiments. This read method is useful in implementing MCAS operations as it returns both the value associated with the specified memory location and information describing allocation state. This read method is also useful for implementing read operations that are not concerned with allocation state and forms a basis for a read embodiment disclosed later in FIG. 10.

An embodiment of the read method of FIG. 4 begins at step 400 where the method is invoked with a reference or address of a memory location to read and a reference or address of a controlling operation descriptor, such as descriptor 220. The read method first reads the current value stored in the specified location at step 410. If the current value is not a descriptor, then this value is returned and the method exits at step 430. Various methods of determining if the current value is a descriptor may be employed in various embodiments. In some embodiments, a range of values may be reserved as representing descriptors, for example by setting a most significant bit of the value or by selecting a range appropriate to the given execution environment or tools used to develop the MCAS operation. In other embodiments a separate field may be used with the memory location. These various embodiments are not intended to be limiting, any suitable means for identifying the difference between a value and a descriptor may be employed.

Should the current value be a descriptor, the method proceeds to step 440 where the parent of the descriptor is identified. For a word descriptor as illustrated in the embodiment shown in 200, the parent may be simply read from the read descriptor. In other embodiments, the parent descriptor may be identified through a search or the read descriptor may be the parent descriptor. Once the parent descriptor is identified, it is compared with the descriptor provided in step 400. If this comparison indicates that the two descriptors do not match, then the memory location may be allocated by another MCAS operation in progress. The status of the parent may then be checked to identify whether the controlling MCAS operation is ACTIVE by reading the status value 221 from the parent descriptor 220. If the parent status is determined to be active, then the memory location is currently allocated by another MCAS operation. In this event, the read method may call the MCAS method, discussed below, using the parent descriptor 460 to enable the controlling MCAS method to complete more quickly. If the MCAS method is invoked in step 460, then once the MCAS completes, control is returned to step 410.

If the parent descriptor is the current operation descriptor or the parent descriptor indicates that the operation is no longer ACTIVE, then the value of the memory location may be determined using the word descriptor for the location. First, the MCAS status of the parent descriptor is checked to see it is marked as persisted in step 465. If the MCAS status of the parent descriptor is set to persisted or if the parent descriptor is the current operation descriptor, the method proceeds to step 470, otherwise the method proceeds to step 466, where a flush primitive is used to write the MCAS status of the parent descriptor into persistent memory. As further described in FIG. 11 below, a fence primitive is used to wait for the flush to complete and the MCAS status of the parent descriptor is set to persisted. The method then proceeds to step 470 where, if the parent status is SUCCESS, the read method returns, at step 480, the controlling descriptor read from the memory location as well as the new value 203 read from the word descriptor 200. If the parent status is not SUCCESS, as checked at step 470, the read method returns, at step 490, the controlling descriptor read from the memory location as well as the old value 202 read from the word descriptor 200.

As disclosed above, the read method 400 returns two values in steps 480 and 490, a controlling descriptor (if any) and the value currently associated with the memory location. In various embodiments, these return values may be implemented in different ways. In some embodiments, the values may be returned in a tuple which is a compound value composed of multiple, potentially heterogeneous elements. In other embodiments, a single return value including a structure containing the required elements may be used. Various embodiments may be suitable based on the choice of development environment used to implement the MCAS operation. It should be understood that only a single return value is provided at step 430 as a controlling descriptor does not exist. In this case, various embodiments may choose to return both values where the descriptor may be any value as it will be ignored by the calling method.

Figure 5:
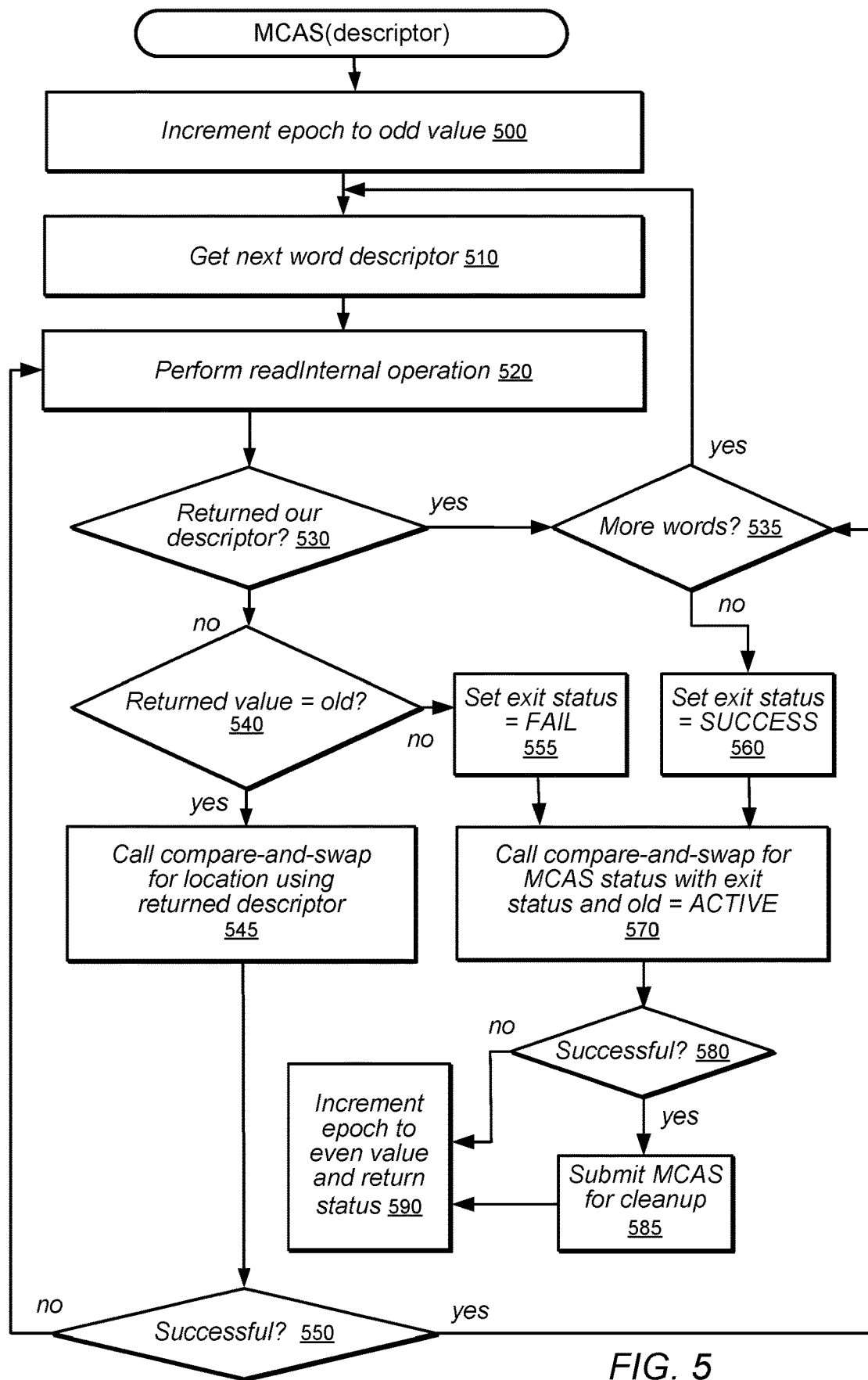
FIG. 5 is a flow diagram illustrating one embodiment of a method for implementing an MCAS operation using a volatile, shared byte-addressable memory.

FIG. 5 is a flow diagram illustrating an MCAS operation using volatile, byte-addressable shared memory according to some embodiments. The MCAS operation of FIG. 5 is provided an operation descriptor such as the descriptor 220. The operation begins with setting an epoch value to indicate that an MCAS operation is active as shown in step 500. This step ensures that threads other than the thread executing the MCAS operation can determine the current state of the MCAS thread. The operation then proceeds to step 510 where the next word descriptor is obtained. The value associated with this word descriptor is then read in step 520. If the read operation returns a descriptor which matches the operation descriptor, then the memory location is already successfully allocated and the process may proceed to the next descriptor 535. Otherwise, the current value is compared 540 to the old value 202 for the memory location. If the comparison indicates the values do not match, then the MCAS operation proceeds to step 555 where the operation sets an exit status with a FAIL value and proceeds to step 570. If the comparison indicates that the values match, then the operation proceeds to allocate the memory locations by calling a CAS primitive at step 545. If the CAS primitive fails 550, the process for the memory relocation is restarted at step 520. Otherwise, the process proceeds to the next word descriptor 535. Once all words have been successfully allocated, the operation sets an exit status with a SUCCESS value and proceeds to step 570.

The MCAS operation of FIG. 5 may exit at step 570 when either all word locations are successfully allocated or one of the comparisons fails. First, the status field 221 of the operation descriptor is updated with the provided status using a CAS primitive 575. The old value provided to this CAS primitive will be a status of ACTIVE so that any update of a non-ACTIVE state will fail. If the CAS primitive fails, the status will have already been updated and the process advances to step 590. If the CAS primitive succeeds, then the operation descriptor is first submitted for cleanup at step 585 before proceeding to step 590. Once at step 590, the operation sets the epoch value to indicate that no MCAS operation is active and returns completion status.

The various embodiments may include various encodings of epoch values. In some embodiments, an epoch value may be implemented as a counter, where an odd value may indicate active MCAS state and an even value may indicate an inactive MCAS state. In other embodiments the odd an even values may indicate opposite states. In embodiments where an epoch value is implemented as a counter, writing the epoch value to set a new state may involve incrementing the counter. In still other embodiments, an epoch value may be implemented as an enumeration. It should be understood, however, that these various embodiments of an epoch value are not intended to be limiting and that other implementations can be envisioned.

In the various embodiments of the MCAS operation in FIG. 5, memory locations may contain addresses of word descriptors rather than new values. The respective values associated with these memory locations, however, are either the new values 203 or old values 202 contained in the respective word descriptors 200. This is indicated by the update to the status field 221 of the operation descriptor 220 as referenced through the parent 204 of the respective word descriptors 200. In this manner, the various embodiments of the MCAS operation defer the updating of the memory locations with the proper values to a time where performance impact may be favorable.

FIGS. 6-9 are diagrams illustrating a progression of states of MCAS control data structures as shown in FIG. 1 used in various embodiments during execution of an exemplary MCAS operation. In this example, the MCAS operation implements a CAS operation of each of two Words 610a and 610b. Initially, each of these Words 610 contain a value of 0 and each word will contain a value of 1 upon completion of the MCAS operation. While the respective Word Descriptors 640 are representative of those shown in FIG. 1, the Parent fields 140 have been omitted for clarity and it should be understood that the Parent fields may exist and be initialized to contain an address of the MCAS Descriptor 620.

Figure 6:
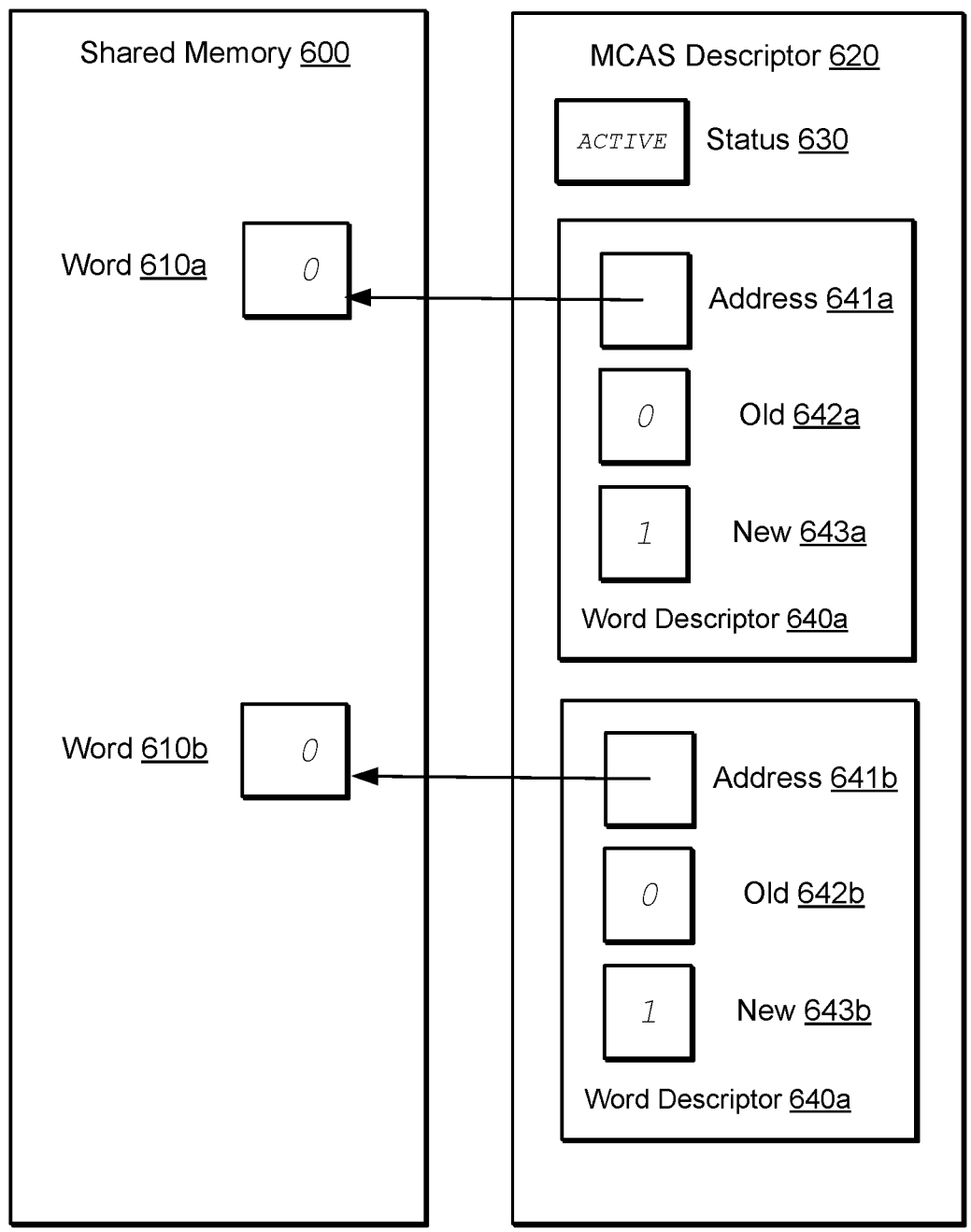
FIGS. 6-9 are diagrams illustrating various states of the MCAS control data structures used in various embodiments during execution of an active MCAS operation.

FIG. 6 shows an initial state upon entry of the MCAS operation according to some embodiments. Upon entry, the respective Address fields 641 are initialized to contain the addresses of their respective Words 610 and the respective Old values 642 contain the current values of the respective Words 610. In addition, the respective New values 643 are initialized to a value of 1, indicating that each of the Words 610 will have a value of 1 upon completion of the MCAS operation. Finally, the Status field 630 is written with a value of ACTIVE, indicating that an MCAS operation is currently in progress.

Figure 7:
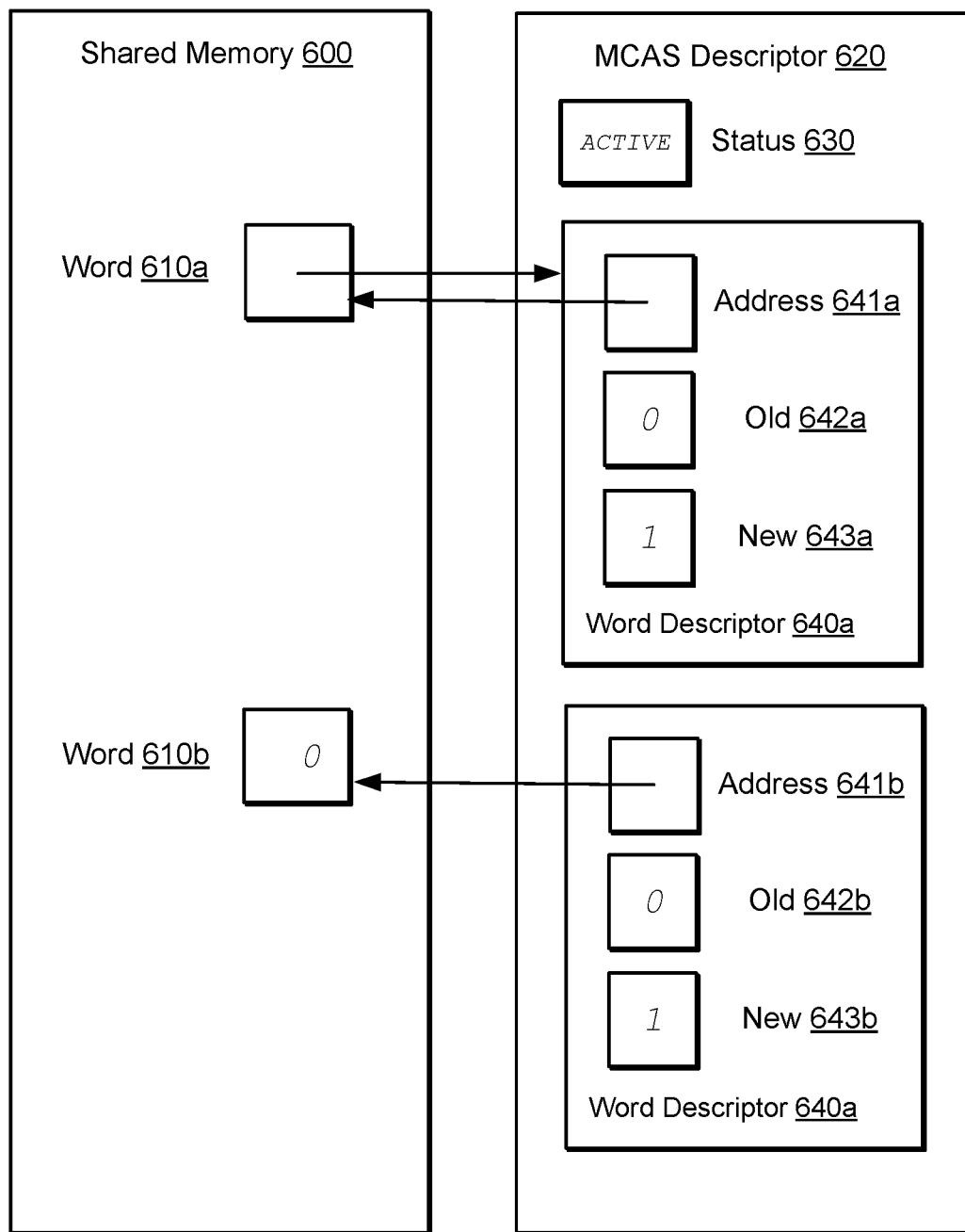

The MCAS operation proceeds to link Word 610a to Word Descriptor 640a using a CAS instruction as described in step 545 of FIG. 5. Upon completion of this CAS instruction, the state of MCAS control data structures is shown in FIG. 7. The contents of Word 610a now contains the address of Word Descriptor 640a and is now allocated for atomic update by the MCAS Descriptor 620. The current value of Word 610a continues to be 0 as defined by the current Status 630 and the Old value 642a and can be read by the readInternal and readLocation functions as discussed in FIG. 4 and FIG. 10.

Figure 8:
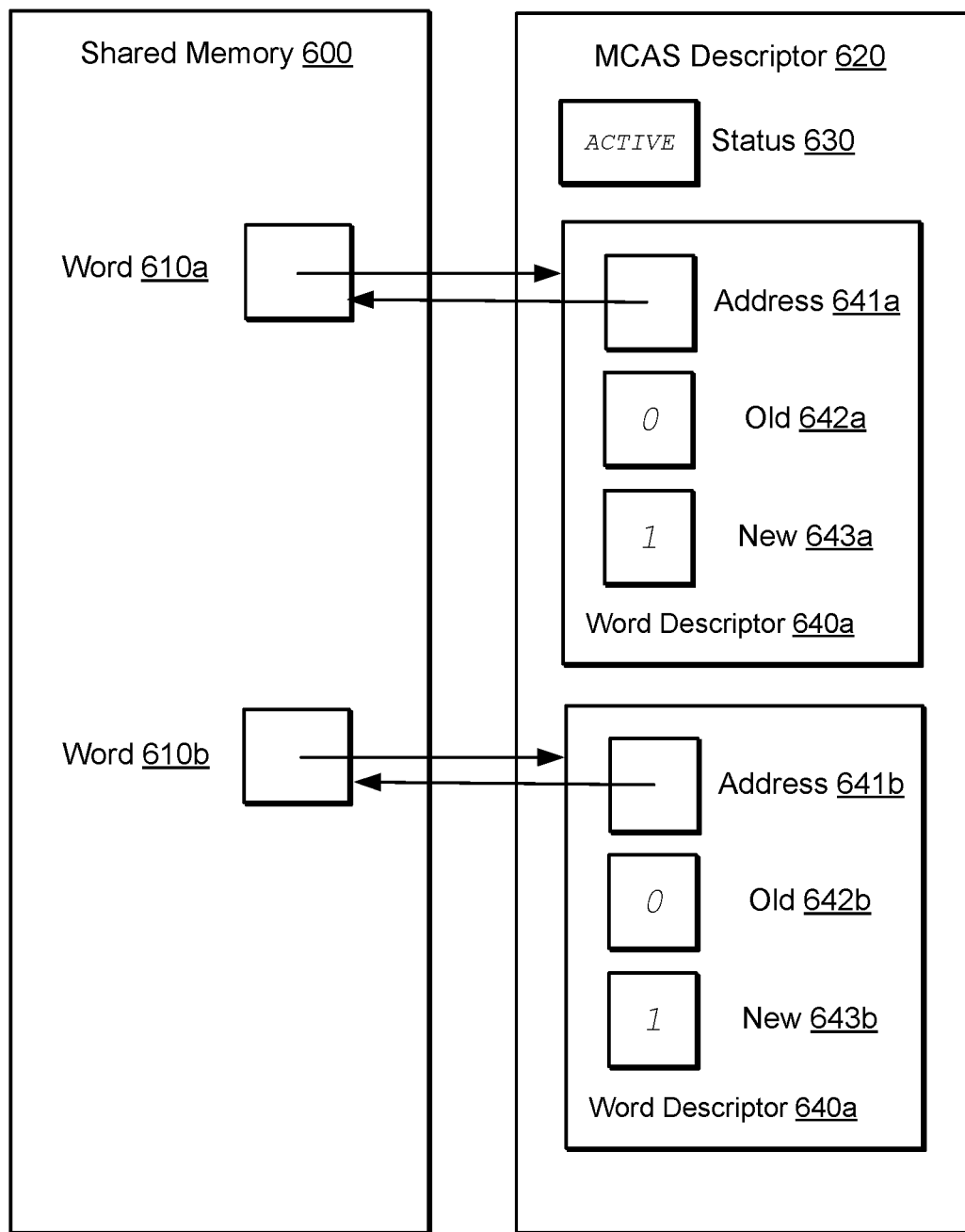

The MCAS operation proceeds to link Word 610b to Word Descriptor 640b using a CAS instruction as described in step 545 of FIG. 5. Upon successful completion of this CAS instruction, the state of MCAS control data structures is shown in FIG. 8. The contents of Word 610b now contain the address of Word Descriptor 640b and is now allocated for atomic update by the MCAS Descriptor 620. The current value of Word 610b continues to be 0 as defined by the current Status 630 and the Old value 642b and can be read by the readInternal and readLocation functions as discussed in FIG. 4 and FIG. 10.

Figure 9:
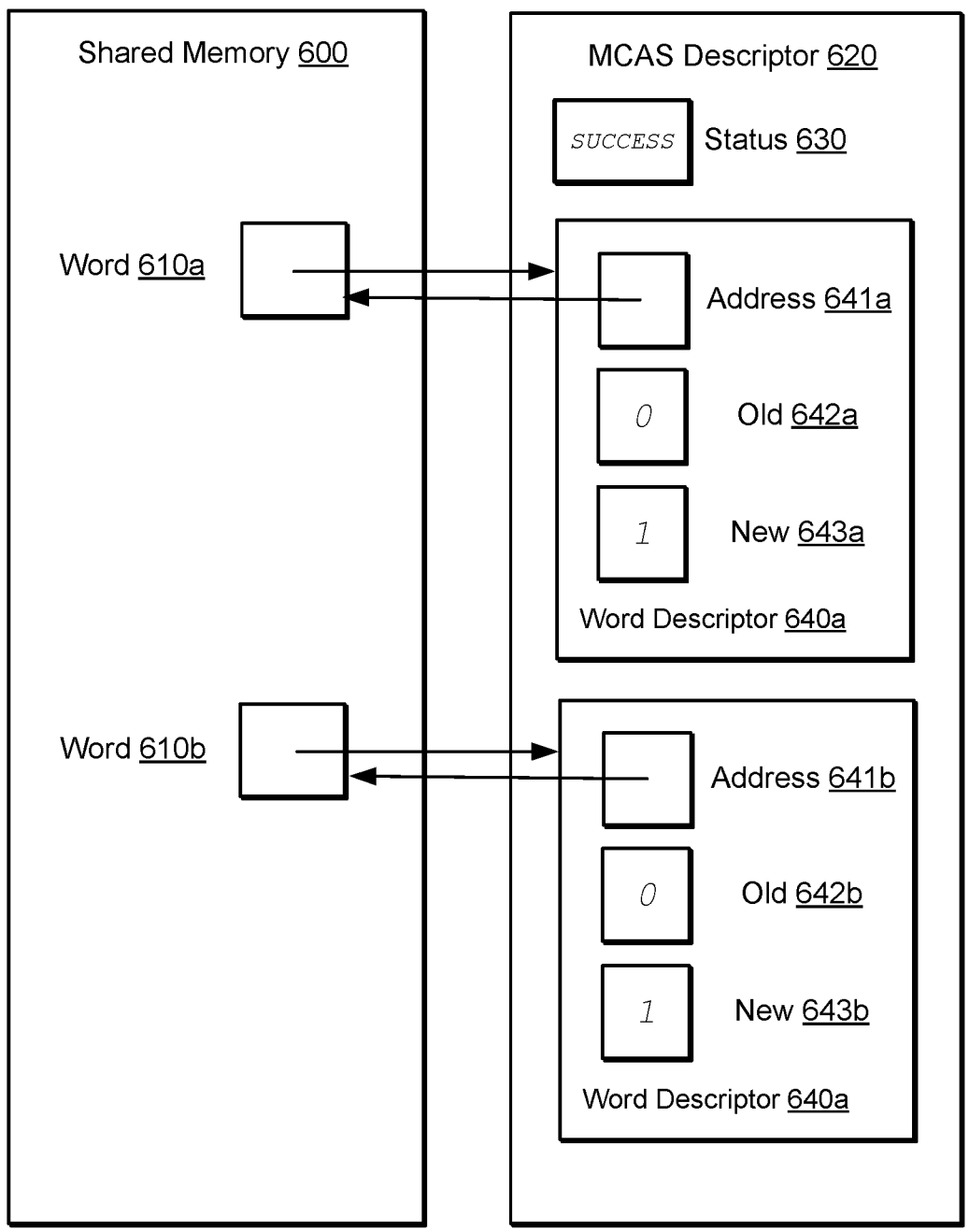

The MCAS operation proceeds to write a SUCCESS value to the Status field 630 using a CAS instruction as described in step 570 of FIG. 5. Upon completion of this CAS instruction, the state of MCAS control data structures is shown in FIG. 9. Here, the MCAS operation is complete and Words 610 are no longer allocated. The contents of Words 610, however, continue to contain addresses of Word Descriptors 640 with the current values of Words 610 now indicated by the current Status 630 and the New values 643 and can be read by the readInternal and readLocation functions as discussed in FIG. 4 and FIG. 10. At this point, Words 610 may be allocated by another MCAS operation, may remain linked indefinitely to the completed MCAS Descriptor 620 through their respective Word Descriptors 640, or may be synchronously or asynchronously updated to their new values in various embodiments through the optional reclaimDescriptors function discussed in FIG. 12.

Figure 10:
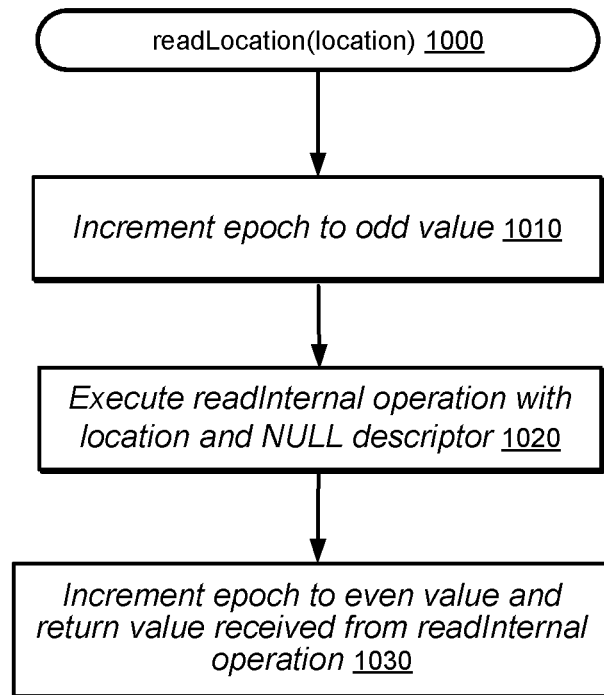
FIG. 10 is a flow diagram illustrating one embodiment of a method for reading a memory location potentially allocated by an MCAS operation.

FIG. 10 is a flow diagram illustrating a read method for memory locations potentially allocated by an MCAS operation according to some embodiments. This read method is useful for implementing read operations that are not concerned with allocation state. An embodiment of the read method of FIG. 10 begins at step 1000 where the method is invoked with a reference or address of a memory location to read. The method begins with setting an epoch value to indicate that an MCAS operation is active 1010. The read method then executes the read method of FIG. 4 using the location provided and a descriptor value that cannot match any existing descriptor value. While this descriptor value is represented as a NULL value in step 1020, it should be understood that that this value could be represented in a variety of ways in various embodiments and may be determined by the development or execution environment of the MCAS operation. By providing a descriptor value in this manner, step 1020 ensures that step 450 of the read method of FIG. 4 operates correctly. The process then advances to step 1030, where the epoch value is set to a value indicating that no MCAS operation is active and the value received from the read method is returned.

Figure 11:
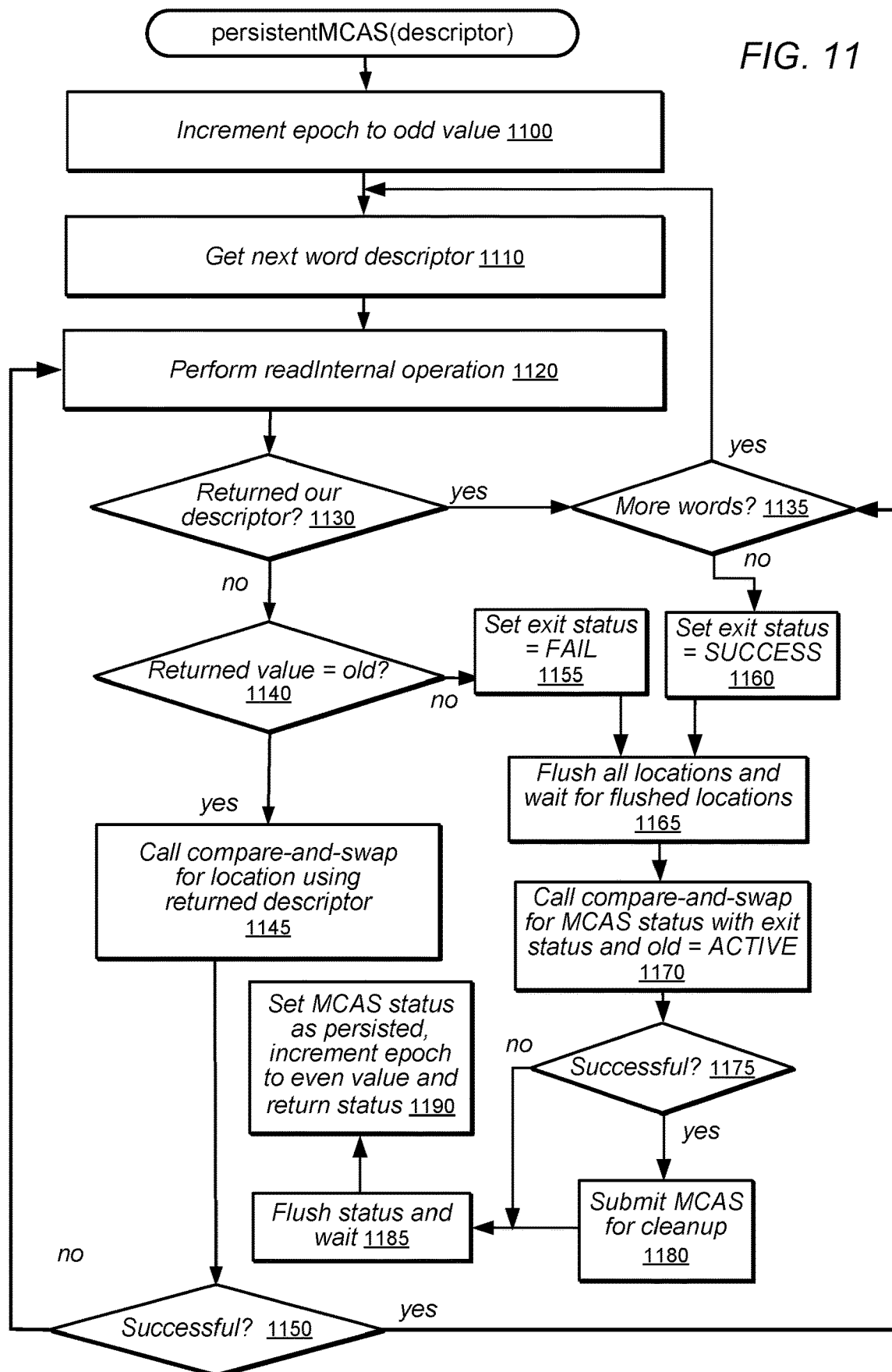
FIG. 11 is a flow diagram illustrating one embodiment of a method for implementing an MCAS operation using a non-volatile, shared byte-addressable memory.

FIG. 11 is a flow diagram illustrating a persistent MCAS (PMCAS) operation using non-volatile, byte-addressable shared memory according to some embodiments. The PMCAS operation of FIG. 11 is extended from the MCAS operation of FIG. 5 to include additional steps needed to ensure a consistent view of data residing in non-volatile memory. These additional steps involve the use of two primitives, a flush primitive which schedules specified memory locations to be committed to memory (but returns prior to the commitment completing), and a fence primitive which waits for all pending, but incomplete flush operations started by flush primitives to complete before continuing. Variations of these primitives are provided as cache management instructions in the instruction set of nearly every modern processor architecture.

The PMCAS operation of FIG. 11 is provided an operation descriptor such as the descriptor 220. The operation begins with setting an epoch value to indicate that an MCAS operation is active 1100. This step ensures that threads other than the thread executing the MCAS operation can determine the current state of the MCAS thread. The operation then proceeds to step 1110 where the next word descriptor is obtained. The value associated with this word descriptor is then read in step 1120. If the read operation returns a descriptor which matches the operation descriptor, then the memory location is already successfully allocated and the process may proceed to the next descriptor 1135. Otherwise, the current value is compared 1140 to the old value 202 for the memory location. If the comparison indicates the values do not match, then the MCAS operation proceeds to step 1155 where the operation sets an exit status with a FAIL value and proceeds to step 1165. If the comparison indicates that the values match, then the operation proceeds to allocate the memory locations by calling a CAS primitive at step 1145. The operation then proceeds to step 1150 where if the CAS primitive fails the process for the memory relocation is restarted at step 1120. Otherwise, the process proceeds to step 1135. Once all words have been successfully allocated, the operation sets an exit status with a SUCCESS value and proceeds to step 1165.

The MCAS operation of FIG. 11 may exit at step 1165 when either all word locations are successfully allocated or one of the comparisons fails. First, the process flushes all locations and waits for the flushed locations to complete using a fence primitive. Next, the status field 221 of the operation descriptor is updated with the provided status using a CAS primitive 1170. The old value provided to this CAS primitive will be a status of ACTIVE so that any update of a non-ACTIVE state will fail. If the CAS primitive fails, the status will have already been updated and the process advances to step 1185. If the CAS primitive succeeds, then the operation descriptor is first submitted for cleanup at step 1180 before proceeding to step 1185. Once at step 1185, a flush primitive is used to commit the status updated in step 1170 to non-volatile memory. The process then advances to step 1190 where the MCAS status is set to persisted, the operation sets the epoch value to indicate that no MCAS operation is active and returns completion status.

Figure 12:
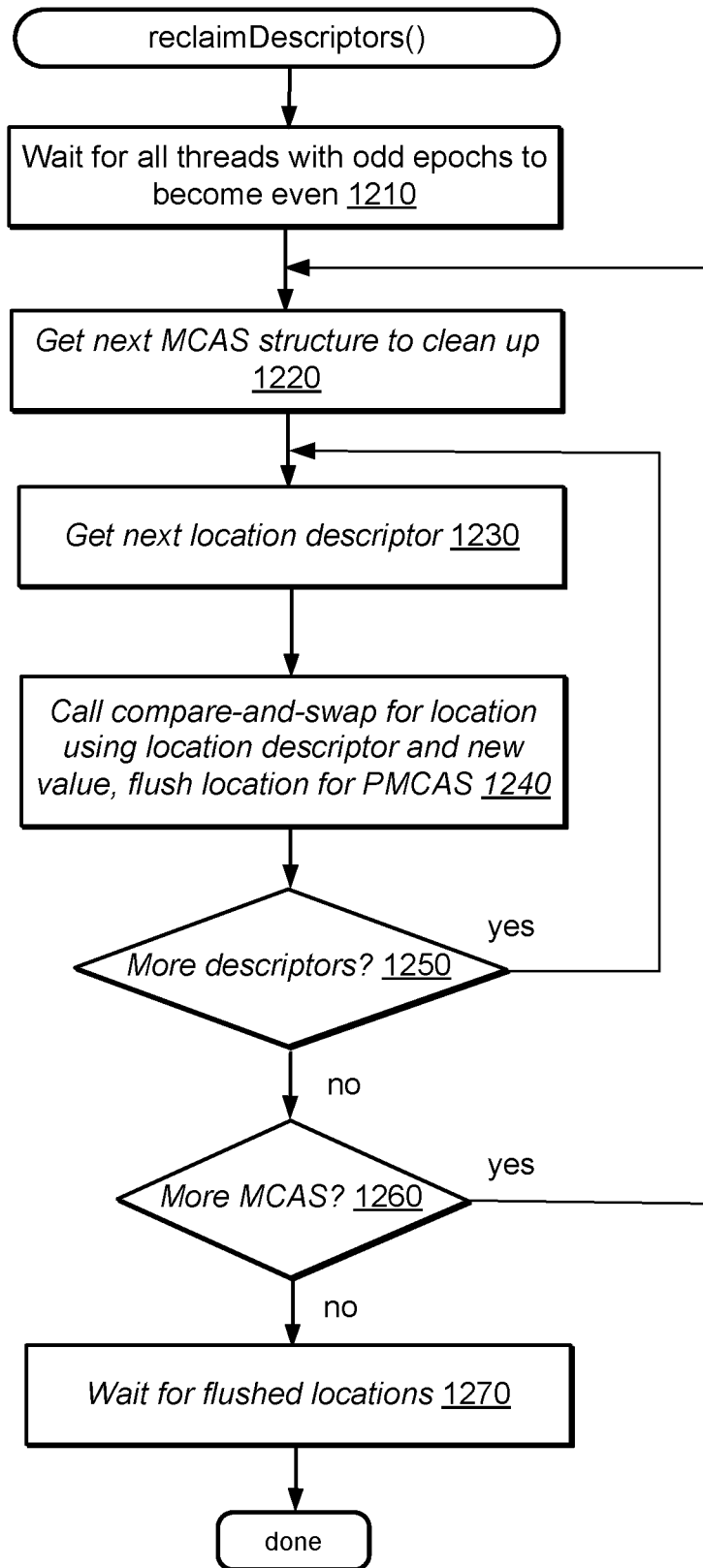
FIG. 12 is a flow diagram illustrating one embodiment of a method for reclaiming descriptors.

FIG. 12 is a flow diagram illustrating one embodiment of a method for reclaiming descriptors. The various MCAS operation embodiments of FIG. 5 and FIG. 11 may leave the various descriptors used in the MCAS operation in a state ready for cleanup as shown in steps 585 and 1185, but various descriptors may remain referenced in memory locations for an indefinite period of time. In some embodiments, these descriptors may remain in this state until a state of program execution may force the state to change and, in fact, in some embodiments descriptors may never be required to be reclaimed. In other embodiments, a method to reclaim descriptors, such as the embodiment of FIG. 12, may be employed.

FIG. 12 begins at step 1210 where all threads participating in MCAS operations are checked to determine if they possess an even epoch. Should a thread possess an odd epoch, the process waits until the thread epoch is incremented to even. The process then advances to step 1220 where the next MCAS operation descriptor to be reclaimed is identified. Once the next operation descriptor is identified, the next word descriptor within the operation descriptor is selected at step 1230. The memory location of the word is then conditionally updated using a CAS primitive using and old value of the relevant descriptor and a new value determined by the completion status 221 of the operation descriptor 220. The result of the CAS primitive of step 1240 may be ignored as the CAS primitive will fail only if the update was not needed. Should PMCAS operations be employed, step 1240 may also use a flush primitive to commit the location to non-volatile memory. This flush may be implemented unconditionally in some embodiments or implemented responsive to a successful CAS primitives in other embodiments. The process then proceeds to the next word descriptor 860 and eventually the next MCAS operation descriptor 1260. Once all MCAS operation descriptor have been processed, the reclamation process advances to step 1270 where the process waits for flushed locations to be committed, if necessary. Once all memory locations are flushed, the reclamation process is complete.

Figure 13:
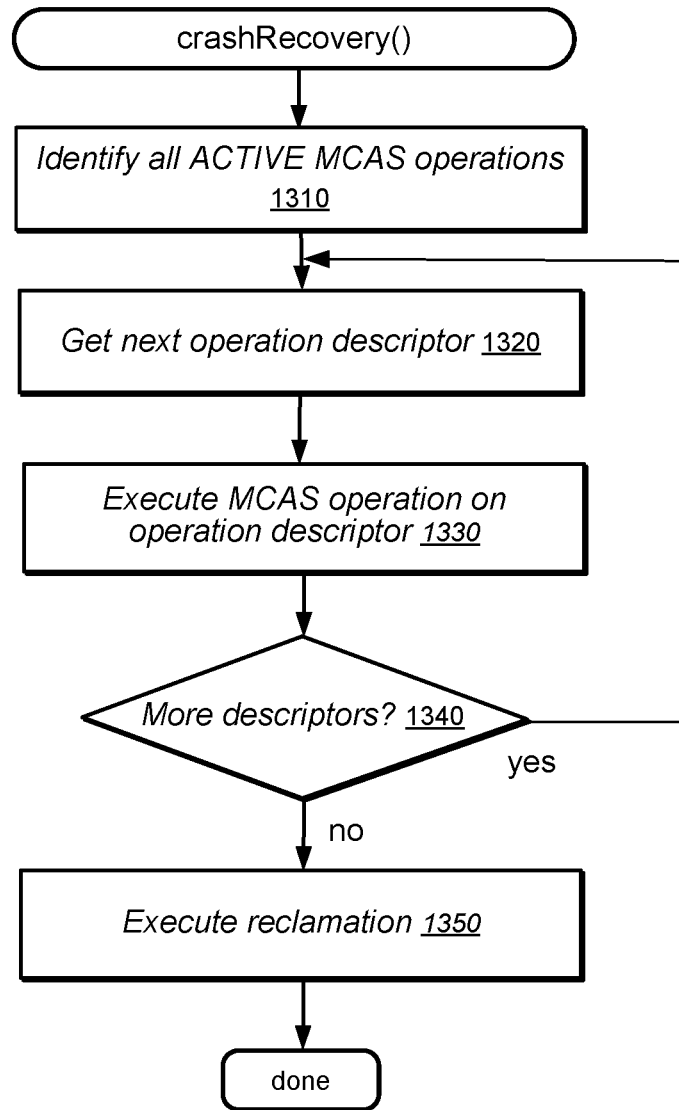
FIG. 13 is a flow diagram illustrating one embodiment of a crash recovery method for non-volatile MCAS operations.

FIG. 13 is a flow diagram illustrating some embodiments of a method for performing a crash recovery for PMCAS operations. Crash recovery operations may be performed in a single thread, thus obviating the need for synchronization of multiple concurrent threads which may ordinarily exist. A crash recovery process begins at step 1310 with the identifying of all active PMCAS operations. In some embodiments this may be accomplished by consulting a list of active PMCAS operation descriptors that may be updated in various ways. For example, in one embodiment this list may be maintained during the allocation of operation descriptors while in another embodiment, this list may be updated when a PMCAS operation, such as in FIG. 11, is started. In yet another embodiment, active operation descriptors may be identified by scanning a list of all existing operation descriptors. Once a list of active operation descriptors is identified, the next descriptor is selected in step 1320 and a PMCAS operation is performed in step 1330. Once performed, the operation identifier may be available immediately for reclamation, however the descriptor will have been submitted for cleanup in step 1185 as shown in FIG. 11. The process proceeds to step 1340 where the next descriptor is selected. Once all identified descriptors have been processed, no active MCAS operations remain. The process continues to step 1350 where a reclamation process, such as shown in FIG. 12, is performed. As no MCAS threads are active, step 1200 of FIG. 12 will not wait on thread epochs to become even and the reclamation process will, therefore, run to completion. Upon completion of the reclamation process, no PMCAS operations will be active and all descriptors will be reclaimed.

Figure 14:
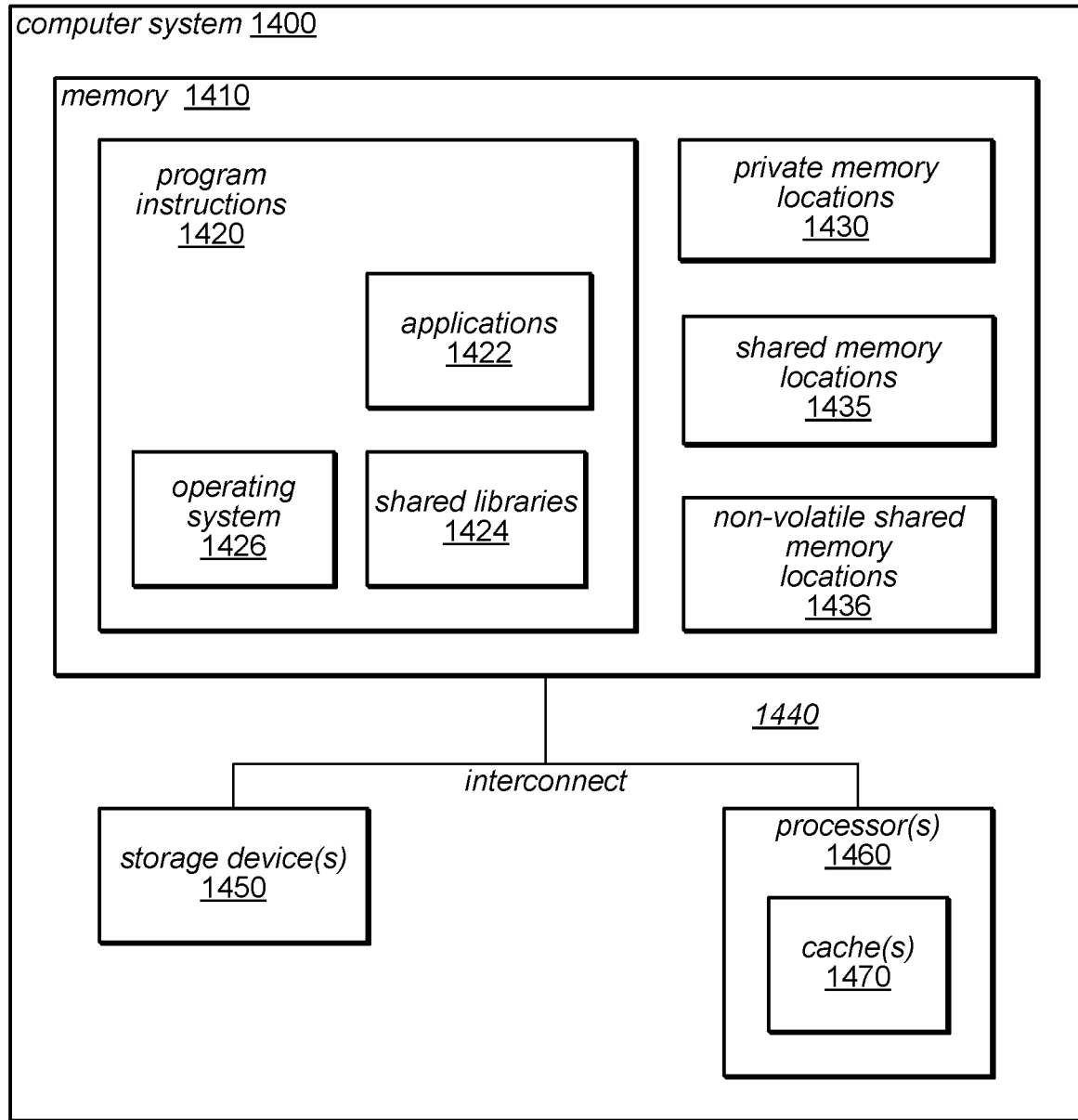
FIG. 14 is a block diagram illustrating one embodiment of a computing system that is configured to implement MCAS operations, as described herein.

The techniques and methods described herein may be implemented on or by any of a variety of computing systems in different embodiments. For example, FIG. 14 is a block diagram illustrating one embodiment of a computing system that is configured to implement such techniques and methods according to various embodiments. The computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms described herein may be provided as a computer program product, or software, that may include a non-transitory, computer-readable storage medium having stored thereon instructions which may be used to program a computer system 1400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1400 may include one or more processors 1460; each may include multiple cores, any of which may be single- or multi-threaded. For example, multiple processor cores may be included in a single processor chip (e.g., a single processor 1460), and multiple processor chips may be included in computer system 1400. The computer system 1400 may also include one or more storage devices 1450 (e.g. optical storage, magnetic storage, hard drive, tape drive, solid state memory, etc.) and one or more system memories 1410 (e.g., one or more of cache, SRAM, DRAM, RDRAM, EDO RAM, DDR RAM, SDRAM, Rambus RAM, EEPROM, etc.). In some embodiments, one or more of the storage device(s) 1450 may be implemented as a module on a memory bus (e.g., on interconnect 1440) that is similar in form and/or function to a single in-line memory module (SIMM) or to a dual in-line memory module (DIMM). Various embodiments may include fewer or additional components not illustrated in FIG. 14 (e.g., video cards, audio cards, additional network interfaces, peripheral devices, a network interface such as an ATM interface, an Ethernet interface, a Frame Relay interface, etc.)

The one or more processors 1460, the storage device(s) 1450, and the system memory 1410 may be coupled to the system interconnect 1440. One or more of the system memories 1410 may contain program instructions 1420. Program instructions 1420 may be executable to implement one or more applications 1422, shared libraries 1424, and/or operating systems 1426.

Program instructions 1420 may be encoded in platform native binary, any interpreted language such as Java' bytecode, or in any other language such as C/C++, the Java™ programming language, etc., or in any combination thereof. In various embodiments, applications 1422, operating system 1426, and/or shared libraries 1424 may each be implemented in any of various programming languages or methods. For example, in one embodiment, operating system 1426 may be based on the Java programming language, while in other embodiments it may be written using the C or C++ programming languages. Similarly, applications 1422 may be written using the Java programming language, C, C++, or another programming language, according to various embodiments. Moreover, in some embodiments, applications 1422, operating system 1426, and/shared libraries 1424 may not be implemented using the same programming language. For example, applications 1422 may be C++ based, while shared libraries 1424 may be developed using C.

In some embodiments, the program instructions 1420 may include MCAS support and/or other functions, operations, or procedures for implementing multithreaded applications that access shared resources, as described herein. Such support and functions may exist in one or more of the shared libraries 1424, operating systems 1426, or applications 1422, in various embodiments. The system memory 1410 may further comprise private memory locations 1430, shared memory locations 1435 and/or non-volatile shared memory locations 1436 where data may be stored. For example, in some embodiments, shared memory locations may store data, metadata, or other shared resources that are accessible to multiple, concurrently executing threads, processes, or transactions, in various embodiments. In some embodiments, private memory locations 1430, shared memory locations 1435 and/or non-volatile shared memory locations 1436 may store thread-local flags, state information, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein. It is intended that the following claims be interpreted to embrace all such variations and modifications.

In conclusion, compare-and-swap (CAS) is a foundational atomic modification primitive used pervasively in concurrent algorithms in shared memory systems to deliver scalable performance on multicore systems. CAS, however, operates only on a single memory word whereas many concurrent algorithms require atomic modification of multiple words. In response, atomic multi-word compare-and-swap (MCAS) operations have been defined, but existing MCAS algorithms are inefficient. Improvements in the various embodiments described herein are achieved by elimination of a major source of complexity and overhead in existing MCAS algorithms. Specifically, nearly all existing MCAS algorithms employ operation descriptors, one descriptor for each words to be modified in the MCAS operation. As part of the traditional MCAS operation, designated memory locations to be updated are allocated, one at a time, by replacing the current value in those locations with an address of a respective descriptor. Once the MCAS operation completes, these allocations must be released by storing either new or old values into memory locations. This release process, however, requires expensive synchronization with other MCAS operations using atomic update primitives.

The various embodiments described herein avoid this costly synchronization step by releasing these locks in a more efficient manner. Once all memory locations are locked in the conventional manner, the MCAS operation may be completed by simply setting a status for the operation in an operation descriptor, thus avoiding the costly step of atomically updating each memory location. These improved MCAS operations may be further coupled with a lazy reclamation process to recover the various descriptors used without impacting performance-sensitive operations. As a result, these MCAS operations are directly constructed from CAS primitives and require only one CAS primitive per modified word, a significant improvement in efficiency over existing MCAS algorithms.

What is claimed is:

1. A method, comprising:
   responsive to receiving a request to read a data element:
   reading a value stored at the data element;
   responsive to determining that the read value is an address of a descriptor for an operation controlling the data element, returning a response to the request comprising one of a plurality of values selected according to a completion status stored in the descriptor; and
   responsive to determining that the read value is not the address of the descriptor for the operation controlling the data element, returning a response to the request comprising the read value.

2. The method of claim 1, wherein the operation controlling the data element is an atomic compare and swap operation on one or more data elements including the data element.

3. The method of claim 2, further comprising:
   responsive to determining that the operation controlling the data element is different than another operation specified in the request to read the data element, performing at least a portion of the atomic compare and swap operation on one or more data elements including the data element.

4. The method of claim 2, wherein:
   the plurality of values comprise an old value and a new value;
   the old value is selected according to a failed completion status of the atomic compare and swap operation; and
   the new value is selected according to a successful completion status of the atomic compare and swap operation.

5. The method of claim 4, wherein performing the at least a portion of the atomic compare and swap operation on the one or more of data elements comprises:
   writing the address of the descriptor for the operation to the data element using an atomic compare and swap instruction, wherein the descriptor comprises the old value and the new value and an address of a parent descriptor for the atomic compare and swap operation;
   writing a successful completion status, subsequent to writing the address of the descriptor of the operation to the data element, to the parent descriptor; and
   sending an indicator of successful completion for the atomic compare and swap operation.

6. The method of claim 5, wherein the one or more data elements reside in non-volatile memory, and wherein performing the at least a portion of the atomic compare and swap operation on the one or more of data elements in non-volatile memory comprises:
   scheduling the result of the atomic compare and swap instruction to be committed to non-volatile memory using a flush primitive; and
   waiting for the result of the atomic compare and swap instruction to be committed to non-volatile memory prior to writing the successful completion status.

7. The method of claim 6, further comprising:
   scheduling the successful completion status to be committed to non-volatile memory using a flush primitive.

8. One or more non-transitory computer-accessible storage media storing program instructions that when executed on or across one or more processors cause the one or more processors to perform an atomic compare and swap operation on a plurality of data elements, comprising:
   responsive to receiving a request to read a data element:
   reading a value stored at the data element;
   responsive to determining that the read value is an address of a descriptor for an operation controlling the data element, returning a response to the request comprising one of a plurality of values selected according to a completion status stored in the descriptor; and
   responsive to determining that the read value is not the address of the descriptor for the operation controlling the data element, returning a response to the request comprising the read value.

9. The one or more non-transitory computer-accessible storage media of claim 8, wherein the operation controlling the data element is an atomic compare and swap operation on one or more data elements including the data element.

10. The one or more non-transitory computer-accessible storage media of claim 9, further comprising:
    responsive to determining that the operation controlling the data element is different than another operation specified in the request to read the data element, performing at least a portion of the atomic compare and swap operation on one or more data elements including the data element.

11. The one or more non-transitory computer-accessible storage media of claim 9, wherein:
    the plurality of values comprise an old value and a new value;
    the old value is selected according to a failed completion status of the atomic compare and swap operation; and
    the new value is selected according to a successful completion status of the atomic compare and swap operation.

12. The one or more non-transitory computer-accessible storage media of claim 11, wherein performing the at least a portion of the atomic compare and swap operation on the one or more of data elements comprises:
    writing the address of the descriptor for the operation to the data element using an atomic compare and swap instruction, wherein the descriptor comprises the old value and the new value and an address of a parent descriptor for the atomic compare and swap operation;

writing a successful completion status, subsequent to writing the address of the descriptor of the operation to the data element, to the parent descriptor; and sending an indicator of successful completion for the atomic compare and swap operation.

13. The one or more non-transitory computer-accessible storage media of claim 12, wherein the one or more data elements reside in non-volatile memory, and wherein performing the at least a portion of the atomic compare and swap operation on the one or more of data elements in non-volatile memory comprises:

scheduling the result of the atomic compare and swap instruction to be committed to non-volatile memory using a flush primitive; and waiting for the result of the atomic compare and swap instruction to be committed to non-volatile memory prior to writing the successful completion status.

14. The one or more non-transitory computer-accessible storage media of claim 13, further comprising:

scheduling the successful completion status to be committed to non-volatile memory using a flush primitive.

15. A system, comprising:

a memory; and one or more processors configured to:

read a value stored at the data element responsive to receiving a request to read a data element;

responsive to determining that the read value is an address of a descriptor for an operation controlling the data element, return a response to the request comprising one of a plurality of values selected according to a completion status stored in the descriptor; and responsive to determining that the read value is not the address of the descriptor for the operation controlling the data element, return a response to the request comprising the read value.

16. The system of claim 15, wherein the operation controlling the data element is an atomic compare and swap operation on one or more data elements including the data element.

17. The system of claim 16, the one or more processors further configured to:

responsive to determining that the operation controlling the data element is different than another operation specified in the request to read the data element, perform at least a portion of the atomic compare and swap operation on one or more data elements including the data element.

18. The system of claim 17, wherein:

the plurality of values comprise an old value and a new value;

the old value is selected according to a failed completion status of the atomic compare and swap operation; and the new value is selected according to a successful completion status of the atomic compare and swap operation.

19. The system of claim 18, wherein to perform the at least a portion of the atomic compare and swap operation on the one or more of data elements, the one or more processors are configured to:

write the address of the descriptor for the operation to the data element using an atomic compare and swap instruction, wherein the descriptor comprises the old value and the new value and an address of a parent descriptor for the atomic compare and swap operation;

write a successful completion status, subsequent to writing the address of the descriptor of the operation to the data element, to the parent descriptor; and send an indicator of successful completion for the atomic compare and swap operation.

20. The system of claim 19, wherein the one or more data elements reside in non-volatile memory, and wherein to perform the at least a portion of the atomic compare and swap operation on the one or more of data elements in non-volatile memory, the one or more processors are configured to:

schedule the result of the atomic compare and swap instruction to be committed to non-volatile memory using a flush primitive; and wait for the result of the atomic compare and swap instruction to be committed to non-volatile memory prior to writing the successful completion status.

* * * * *